(12) United States Patent
Crawford et al.

(10) Patent No.: US 7,950,333 B2
(45) Date of Patent: May 31, 2011

(54) PASSIVE MAGNETIC LEVITATION RIDE FOR AMUSEMENT PARKS

(75) Inventors: David W. Crawford, Long Beach, CA (US); Jonathan G. Georges, Los Angeles, CA (US); Frank William Marquette, Pasadena, CA (US); Matthew Aldren Simmons, Christchurch (NZ); Michael Craig Shatford, Christchurch (NZ)

(73) Assignee: Disney Enterprises, Inc., Burbank, CA (US)

( * ) Notice: Subject to any disclaimer, the term of this patent is extended or adjusted under 35 U.S.C. 154(b) by 376 days.

(21) Appl. No.: 12/046,182

(22) Filed: Mar. 11, 2008

(65) Prior Publication Data

US 2009/0229487 A1    Sep. 17, 2009

(51) Int. Cl.
*B60L 13/04* (2006.01)
*A63G 21/00* (2006.01)

(52) U.S. Cl. ............. 104/283; 104/286; 104/69; 104/59

(58) Field of Classification Search ................. 104/23.1, 104/23.2, 64, 69, 70, 283, 281, 286, 59
See application file for complete search history.

(56) References Cited

U.S. PATENT DOCUMENTS

| | | | |
|---|---|---|---|
| 3,114,332 A | 12/1963 | Bacon | |
| 3,791,309 A | 2/1974 | Baermann | |
| 3,842,751 A * | 10/1974 | Thornton et al. | ............. 104/285 |
| 3,850,109 A * | 11/1974 | Thornton | ...................... 104/285 |
| 5,722,326 A | 3/1998 | Post | |
| 6,374,746 B1 * | 4/2002 | Fiske | ......................... 104/138.1 |
| 6,633,217 B2 | 10/2003 | Post | |
| 6,684,794 B2 | 2/2004 | Fiske et al. | |
| 7,059,252 B2 * | 6/2006 | Guardo, Jr. | ................... 104/281 |
| 7,224,252 B2 | 5/2007 | Meadow, Jr. et al. | |
| 2007/0207866 A1 * | 9/2007 | Hunter | ............................. 472/43 |
| 2009/0193997 A1 * | 8/2009 | Payne | ............................. 104/53 |

* cited by examiner

*Primary Examiner* — S. Joseph Morano
*Assistant Examiner* — Zachary Kuhfuss
(74) *Attorney, Agent, or Firm* — Marsh Fischmann & Breyfogle LLP; Kent A. Lembke (57) ABSTRACT

A track and vehicle assembly for amusement park ride. The assembly includes a track with an arcuate contact surface and banked corners. A levitation circuit is placed along a length of the track with passive electric coils. The assembly includes a vehicle with a body for receiving passengers. The vehicle body includes a bottom surface that is adjacent to the contact surface of the track when the vehicle is positioned on the track. To utilize passive magnetic levitation, the vehicle includes arrays of permanent magnets positioned proximate to the bottom surface of the body. The magnet arrays are arranged, such as Halbach arrays, to produce a substantially one-sided magnetic flux distribution directed outward from the vehicle body. The vehicle is levitated above the track contact surface and allowed to move side-to-side by interaction of the permanent magnets and the coils when the vehicle travels above a minimum velocity.

23 Claims, 6 Drawing Sheets

PASSIVE MAGNETIC LEVITATION RIDE FOR AMUSEMENT PARKS

BACKGROUND OF THE INVENTION

1. Field of the Invention

The present invention relates, in general, to roller coasters and other amusement park rides, and, more particularly, to vehicle and track designs and systems to provide passengers with ride experiences that include flying or banked corners similar to those experienced in a luge, an alpine slide, a bobsled course, and the like in a controlled and safe environment and with a smooth, floating or flying sensation.

2. Relevant Background

Amusement parks continue to be popular worldwide with hundreds of millions of people visiting the parks each year. Park operators continuously seek new designs for thrill rides because these rides attract large numbers of people to their parks each year. Roller coasters and other thrill rides provide numerous twists, turns, drops, and loops at high speeds that many park goers demand. These rides may be gravity driven, as is the case with many roller coasters, or powered to provide a desired user experience with a particular track configuration. A thrilling portion of some of these rides is the side-to-side movement as a car travels along a track. Other rides provide the high speed banking experience as a car or vehicle goes rapidly around a banked corner or bend such as at a portion of the track that is not flat but is instead angled or sloped such that the vehicle is tipped, which forces the passengers to lean or shift to the left or right. Passengers find such experiences exciting because they are experiences they typically do not obtain in their own vehicles, e.g., with highways typically having relatively low speed limits on any banked curves such as freeway entrance and exit ramps and rapid side-to-side movement being unsafe for automobiles.

In particular, the banking sensation is a key portion in amusement park rides that attempt to provide "flying corners." These rides simulate bobsleds or a luge with a track that is U-shaped or arcuate in cross section, and vehicles on wheels, casters, sleds/skis, or the like ride within the track-defined chute, dry flume, trough, or pipe. As with many roller coasters, the vehicle is released at a high point in the track and gravity provides the motive force for moving the vehicle along the course of the track with the rises, falls, and curves used to control the speed of the vehicle. In such rides, the cornering is considered a flying corner as the car or vehicle is able to travel transversely relative to the primary direction of travel without mechanical guides or rigid tracking. A well-designed bobsled-type ride may provide flying corners with a unique banking and overall ride experience.

Flying corner rides, however, have not been widely adopted or utilized in amusement parks due to a number of serious limitations. Existing tracks have typically been formed of wood and are very difficult and expensive to fabricate. The tracks generally are very large and deep because escape from the channel is prevented by the depth of the channel (or height of the edges) when combined with the configuration of the vehicle (e.g., its width, weight, and other design parameters). In addition to cost configurations, the rides may involve a considerable amount of vibration as the vehicle's hard wheels contact portions of the surface, and significant design efforts, with associated added costs and complexity, have been attempted to absorb or remove this shock or vibration to try to make the rides smoother and more enjoyable for the passengers. Other concerns with conventional bobsled or luge-type rides have included braking of the vehicle at the end of the ride, and these efforts have often created complex braking systems that further add to a ride's installation and maintenance costs.

As a result of these concerns of safety and cost, flying corner or bobsled/luge rides are not provided at most amusement parks. There remains a need for a method of providing park guests with a thrill ride that provides the sensations associated with flying corners or side-to-side and banking movement similar to a bobsled or luge traveling on an ice-lined chute.

SUMMARY OF THE INVENTION

The present invention addresses the above problems by providing a track and vehicle assembly that is adapted for use in an amusement park ride to provide flying corners similar to a bobsled experience. Briefly, the track is shaped such that it defines a channel or flume with a curved or arcuate contact surface between its edges or sidewalls. The track includes two, three, or more levitation circuits or coils of wire that extend along the length of the track with a face or side exposed to or near the contact surface of the track. A vehicle is provided with a body having a lower or bottom surface, and one or more arrays of permanent magnets are provided on, near, or extending out from this bottom surface or wall of the body. These magnets are arranged to provide a stronger field and, in some cases, a one-sided flux distribution such that the distribution (or stronger field) is directed outward from the bottom surface of the vehicle body (e.g., away from the vehicle).

During operation of the assembly, the vehicle is accelerated to a minimum velocity such that the field or flux of the permanent magnets in the arrays on the vehicle body excite or induce current to flow in the coils in or on the track to generate a magnetic field that repels the permanent magnets and levitates the vehicle above the track contact surface. The assembly is generally passive in that gravity is typically used to maintain the vehicle at or above the levitation velocity and no power is required to generate the magnetic fields and/or levitation force. The assembly utilizes passive magnetic levitation to generate a smooth, flying bobsled or luge ride in which passengers experience a unique ride that is nearly vibration free but yet includes flying corners/banking as the vehicle is allowed to move side-to-side through corners and/or banks.

More particularly, a track and vehicle assembly is provided for use in an amusement park ride with passive magnetic levitation. The assembly includes an elongated track with a curved or arcuate contact surface and including one or more banked corners. The track includes a levitation circuit assembly with coils of electrically conductive wire. The coils typically extend along the length of the track with at least a portion or surface proximate to or coinciding with the contact surface of the track. The assembly further includes a vehicle with a body for seating or receiving a passenger. The vehicle body includes a bottom or lower surface that is adjacent to the contact surface of the track when the vehicle is positioned in the track channel or flume. To utilize passive magnetic levitation, the vehicle includes two or more arrays of permanent magnets that are positioned proximate to the bottom surface of the body (e.g., mounted on or extending away from this surface or within the body adjacent the bottom surface). Each of the arrays of the permanent magnets is arranged to produce a substantially one-sided magnetic flux distribution (e.g., a stronger field on one side of the array) that is directed outward from the body of the vehicle such as by arranging the magnets in a Halbach array or other useful pole pattern. The vehicle is levitated a distance above the track contact surface by interaction of the permanent magnets and the coils when the vehicle travels next to the contact surface at a velocity greater than at least a levitation velocity (such as several miles per hour or the like). Also, the vehicle is allowed to move transverse to the plurality of coils and to a main direction of travel (at least in the banked corners where the vehicle moves side-to-side to provide a flying corner sensation).

Side-to-side travel is supported by providing a plurality of coils in the track such that the magnet arrays may excite or interact with a first set of coils in a first length of the track (e.g., a straightaway) but excite or interact with a second set of coils in a second length of track (e.g., a banked corner). Side-to-side travel is also supported by providing three, four, or more coils in the track and, in some cases, providing coils not just in the center, flatter portion of the track but also in the sidewalls. With this in mind, the track may include three, four, five, or more coils and each such coil may be oval or substantially rectangular in profile (e.g., wrapped about a rectangular or oval core) with a wider or larger surface/face positioned near or coinciding with the track contact surface to facilitate inducing current flow and generation/direction of a magnetic field and resulting levitation force. The vehicle is generally unrestrained from traveling some predefined distance transverse to a main direction of travel of the vehicle (such as 1 to 3 feet or more in each direction), but, in some embodiments, a mechanism may be provided for preventing the vehicle from exceeding this predefined distance (such as additional permanent magnet arrays on the vehicle side that interact with additional passive coils provided on the track sidewall or other more mechanical devices such as bumpers, pacers, or the like).

DETAILED DESCRIPTION OF THE PREFERRED EMBODIMENTS

Embodiments of the present invention are directed to an amusement park ride or track and vehicle combination or system for such a ride that provides a guest or rider the sensations and experiences associated with a bobsled but with a smoother, floating sensation rather than bracing vibrations. More specifically, embodiments of the invention provide a track and vehicle assembly that allows a vehicle to be levitated or supported a small distance above a track surface using magnetic forces. Significantly, the magnetic forces are generated passively in the sense that the vehicle includes one or more permanent magnets (e.g., a plurality of magnets arranged in a Halbach array or other configuration to create a strong field directed outward from the vehicle bottom surface) while the track includes one or more levitation coils that are not powered (e.g., are insulated, electrically-conductive wire arranged in a closed loop) that run along a length of the track. The vehicle is accelerated to a launch or start velocity to generate a levitating force by inducing electric currents to flow in the coils of the track, and the track is configured to maintain this or higher velocities throughout the course defined by the track using gravity and selective upward and downward sloped sections.

Additionally, the vehicle is typically not constrained to travel within a groove or along a single travel path but is instead allowed to move transverse to the direction of travel as the vehicle moves through a corner or turn in the track based on varying environmental or guest conditions. The transverse movement allows the rider to experience flying corners as the vehicle is able to shift its center of gravity to the left or right as it banks a corner and, preferably, the transverse movement occurs without or with minimal physical restraint to provide the unique ride experience of a flying or un-tethered corner as the vehicle travels up and down the track. The track includes the levitation coils and has a curved or arcuate surface (above which the vehicle is typically supported by levitation or magnetic forces). In some embodiments, levitation coils are provided across a substantial portion of the track width or its surface allowing the vehicle to shift to one or other sides to be levitated by one or more different coils (e.g., initial travel may involve levitation with a first pair or set of coils while a curve or bank may cause the vehicle to shift to one side and then be levitated by differing coils or the coils may remain paired with the same set of magnets or arrays of magnets throughout the ride with the side-to-side travel being facilitated by the location of the coils in the track). The track has an arcuate cross section defined by curved tips, edges, or sidewalls that extend upward from a center contact portion, e.g., generally form a C-shaped or U-shaped cross section when viewed along a longitudinal axis. The track and vehicle are often configured such that no guidance or upstop devices are required to maintain the vehicle on the track, but some embodiments may include upstops such as additional passive magnetic devices to minimize risks of flipping of the vehicle or the vehicle escaping the track or its defined chute or flume by limiting the amount of side-to-side or transverse movement of the vehicle. The depth of the track or height of the sidewall may also be configured to control the path traveled by the vehicle, without requiring a limiting track, guide slots, or the like (although some embodiments may add these safety devices as limiters of the free floating travel).

Figure 1:
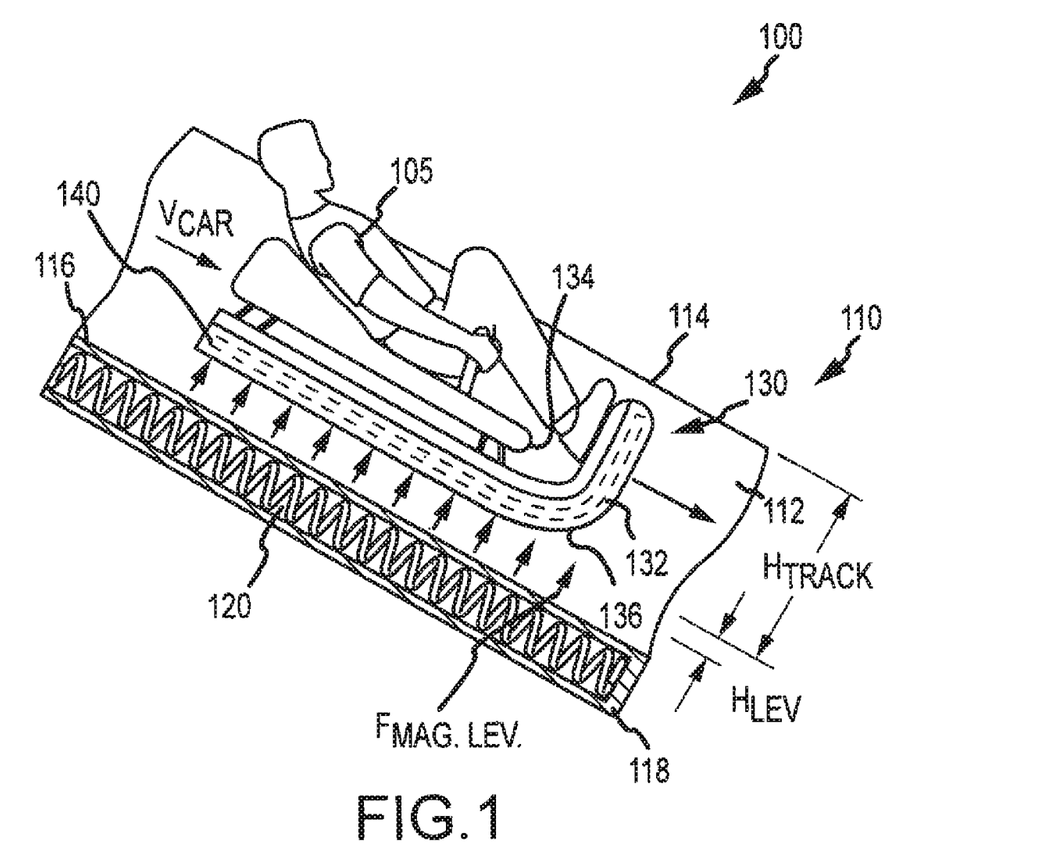
FIG. 1 is a partial sectional, side view of a passive magnetic levitation amusement park ride in which a luge-type vehicle is levitated using a permanent magnet assembly on/in the vehicle and one or more passive coil provided along the length of the track.

FIG. 1 illustrates a partial view of a track and vehicle assembly 100 that may be used to provide a floating bobsled or flying corners ride for a guest or passenger 105. As shown, the assembly 100 includes a vehicle 130 and a channel or track (or track flume) 112 with a pair of sidewalls 114 (with one side shown in FIG. 1), an inner or "contact" surface 116, and a lower track structure, frame, or substrate 118 that may extend within the lower portion of the track 110 or up the entire or a portion of the sidewalls 114. Although not readily seen in FIG. 1, the track channel 112 has a curved or arcuate cross sectional shape and provides a curved upper or main contact surface between two sidewalls 114. The specific shape of the channel 112 or contact surface 116 is not limiting to the invention and may vary significantly to practice the invention. Generally, the surface 116 will range from substantially planar (such as on portions of the track 110 providing a linear path or a straightaway such as at the top or start of a ride and at the bottom or finish/end of a ride) to a more C or U-shaped section as shown in FIG. 1 (and also in FIGS. 3-5) that may be considered to be a circle segment, a parabola, an ellipse, or simply arcuate in shape. The width of this contact surface, which may be the same as the channel width, may also vary and may be considered an arc length or circle segment length. The distance between the tips of sidewalls 114 and their height, $H_{track}$, and/or shape are, in some embodiments, selected to prevent a vehicle from traveling outside the defined flume, and these parameters of the track 110 will vary to suit the design of the track course (e.g., based on parameters such as the amount of fall, the amount of banking, and the like), the vehicle 130 design, speeds, $V_{car}$, desired/expected, the arrangement of magnetic levitation components, and other factors.

The vehicle 130 includes a body 132 that is generally, in this example, arranged similar to a conventional luge or sled for one passenger 105 with a seat/bench 134 to support the passenger 134. The body 132 further is adapted to carry a portion of the magnetic levitation assembly or components. Specifically, the body 132 includes one or more permanent magnets 140 that are arranged to have a strong field below the body 132 such as to be directed outward through the bottom or contact surface 136 of the body 132 (e.g., a field that is generally transverse to a plane passing generally through the surface 136). In one embodiment, the permanent magnet device 140 includes a plurality of permanent magnets arranged in a Halbach array as explained below with reference to FIG. 2. The array or device 140 may extend substantially the entire length of the surface 136 or some smaller portion (such as for at least about 0.25 to 0.75 or more of the surface) with the length of the array or device 140 selected to assure that the surface 136 is levitated an adequate distance, $H_{lev}$, above the surface 116 of the track 112. Also, the surface 136 may include wheels or casters in some cases or, as shown, provide one or more skis or skids that may periodically contact the surface 116 of the track 112 (such as at a start and end of the assembly 100 where the vehicle 130 may be supported on pacers or other devices (not shown in FIG. 1 but shown in FIG. 6)). The magnet array or device 140 may be exposed and supported below the body 132 such as to extend below the surface 136, to be coplanar with the surface 136, or to be somewhat recessed from the surface 136 (such as 0.1 to 0.5 inches or more offset from the surface 136 to limit contact with the magnets). Alternatively, the magnet array 140 may be encased in the body 132 that would then preferably be formed of a material that does not substantially interfere or insulate the magnetic field of the device 140 from being directed out of the body 132 through surface 136.

To create a passive magnetic levitation of the vehicle 130 to a height, $H_{lev}$, the track assembly 110 includes a levitation coil assembly 120 physically supported and positioned within frame 118. Generally, the assembly 120 includes one coil or, more typically, two or more coils of electrically conductive wire that extends along the length of the track 112 (or at least along portions for which levitation is desired). As with the magnetic assembly 140, the coils of assembly 120 are typically positioned near the surface 116 or so as to be exposed/ coplanar with the surface 116 or even to extend outward a particular distance from the surface 116 (e.g., a portion of the coil assembly 120 may provide the "contact" surface 116 of the track 112. The coil assembly 120 may include a set of side-by-side coils that is provided within a certain portion of the track assembly 110 or extend generally across the entire contact surface 116. The shape or profile of the coils in assembly 120 (as viewed from an end) may vary to practice the invention but is generally chosen to direct a magnetic field upward or into the track/channel 112 through contact surface 116 so as to act as a levitation force when combined with the downward or outward magnetic force generated by magnets in assembly 140. In some cases, as discussed with reference to FIG. 2, the profile of the coil of assembly 120 is substantially rectangular with curved corners while in other cases the profiles used may be more oval or elliptical and in other cases more circular profiles may be used for all or a portion of the coils. The levitation height or separation achieved, $H_{lev}$, will also vary during operation of the assembly 100 and typically will be relatively small such as less than about 6 inches, more typically less than about 3 inches and, in some cases, less than about 1 inch. The height, $H_{lev}$, also likely will vary during the operation of the assembly 100 as the vehicle 105 moves rapidly around banked corners and down relatively steep inclines and the velocity or speed, $V_{car}$, varies on the track 110.

As can be seen from the vehicle and track assembly 100, an amusement park ride utilizing the features of the invention may be used to provide a new and unique ride experience. While similar in some ways to existing luge or bobcart rides, the assembly 100 eliminates nearly all friction and/or contact between the guest vehicle 130 and the track surface 116. The magnetic levitation at $H_{lev}$ provides an extremely smooth and unique experience with the minimal power requirements for starting and braking (and/or pacing of vehicle speed at some points in a ride) making the ride power efficient and relatively inexpensive to operate. The vehicle 130 actually floats above the track channel 112 and remains contained within the track sidewalls 114 with no supplemental power required. The concept described herein eliminates or lessens the vibration transmission between the track 110 and vehicle 130 that was inherent in prior bobsled rides and found in roller coasters. The assembly 100 uses a passive drive systems in which forces are self-generated magnetism for levitation and gravity for vehicle speed along the ride course, and the passive drive system does not require power or additional controls. The elimination of much of the friction and contact reduces wear and maintenance concerns when compared with previous rides that relied on supported the sleds/vehicles on skis and/or casters that were in direct contact with the track or trough.

The ride assembly 100 provides an actual flying or levitating vehicle 130 that is delivered as a downhill, inductively levitated cart and track system. The concept incorporates a combination of a gravity centering design for a track (such as track 110) and passive inductive levitation, as may be provided in the assembly 100 as described in detail in U.S. Pat. No. 3,791,309, which is incorporated in its entirety herein by reference or may be provided in other ways known to those skilled in the arts such as described below with reference to FIG. 2. In operation of assembly 100, the luge cart or vehicle 130 may be loaded with passenger 105 and caused to begin rolling in direct contact with the track surface 116 (such as with pacers or another acceleration mechanism such as an LSM device, an LIM device, or the like). When the velocity, $V_{car}$, reaches or exceeds a minimum velocity for levitation (or a levitation velocity), such as about a walking pace or several miles per hour or the like, the vehicle 130 is caused to levitate to a particular levitation height, $H_{lev}$, due to the action of the permanent magnets of assembly 140 in or on the car body 132 and the adjacent and proximate levitation coils in assembly 120. Acceleration and speed, $V_{car}$, may be governed in the assembly 100 by the fall and rise of the track 110, and the positioning of the luge or vehicle 130 may be governed by gravity and centripetal forces provided by the design of the track assembly 110. Speed, $V_{car}$, may be controlled simply by track design or further by a friction braking system or another braking/pacing system (such as a magnetic braking system) that provides contact at one or more locations along the track length to remove energy from the vehicle 130, e.g., some form of drag that slows the car 130 such as rotating tires or pacers that may contact the bottom or sides of the vehicle body 132, static friction surfaces, or the like.

Figure 2:
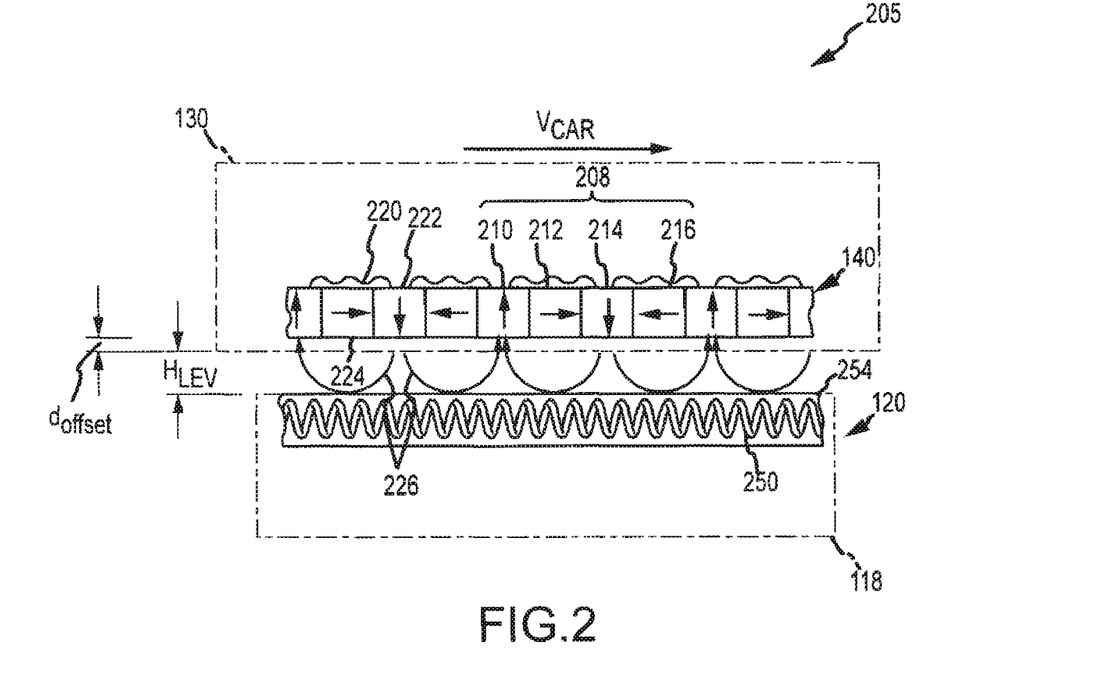
FIG. 2 illustrates with a partial sectional, functional view one embodiment of the ride of FIG. 1 in which the permanent magnet assembly includes permanent magnets arranged in a Halbach array and also showing use of a passive levitation circuit in or on the track.

FIG. 2 illustrates in more detail a levitation assembly 205 such as may be used with the vehicle and track assembly. 100 of FIG. 1 or with the assemblies shown in FIGS. 2-6 to levitate a vehicle 130 a height/distance, $H_{lev}$, over a track 110 using passive magnetic levitation. As shown, the vehicle 130 is traveling a velocity, $V_{car}$, that is at or exceeds the levitation velocity (such as about 4 to 7 mph or the like). The magnet assembly 140 is shown to include a plurality of permanent magnets (e.g., rectangular magnets of NdFeB or other magnetic materials such as those considered strong, permanent magnets) 210, 212, 214, 216, and so on. The magnets are arranged in a set 208 with a polarity pattern or direction of their magnetic field that generally causes the magnetic field to be weak at an upper surface 222 as shown with canceling magnetic field lines at 220 (e.g., to be weak to non-existent in the direction of the vehicle body or interior). In contrast, the pattern of the set 208, which is repeated for additional sets of the magnets throughout the assembly 140, is chosen such that on a lower or outward-facing surface 224 the magnetic field is strong as shown with the combining or additive magnetic field lines 226. In this manner, the array or device 140 creates a strong magnetic field that can be directed toward a coil 250 in the levitation coil assembly 120 of the track structure or frame 118. The offset, $d_{offset}$, between the array surface 224 and the surface of the vehicle body is typically kept relatively small, such as less than about 1 inch to less than about 0.25 inches, with some embodiments exposing the surface 224 or even extending it outward from body 130. The coil 250 of assembly 120 preferably extends on or near the surface of the track and may be encased in a protective material or this material may be eliminated in some cases to expose the coil 250 more directly to the array 140.

In one embodiment, the magnet device 140 is formed with permanent magnets that are arranged in a Halbach array as shown by the arrows corresponding to the orientation of the magnets or direction of their magnetic fields. In a Halbach array, the magnets 210, 212, 214, 216 have magnetic field lines that reinforce one another below the array 140 as shown at 226 on surface 224 but act to cancel one another above the array 140 as shown at 220 on surface 222. When the array 140 is moving, $V_{car}$, with the vehicle body 130, the magnets in the set 208 and other sets induce a current in the coil 250 (and other coils not shown in track structure 118), which produces an electromagnetic field that repels the array 140 due to its magnetic field directed toward the coil assembly 120, thereby levitating the vehicle body 130 a height, $H_{lev}$.

Significantly, the passive magnetic levitation system 205 is passive as it uses no superconducting magnets or powered electromagnets. The magnets 210, 212, 214, 216 of array 140 may be permanent magnets that can be used at room temperature. In one embodiment, the array or device 140 is provided at or near the underside of a vehicle body 130 and arranged in a flat, rectangular array of magnetic bars in the special pattern shown and known as a Halbach array, e.g., with magnetic orientations of each bar being at right angles to the orientations of the adjacent bars/magnets such as magnet formed from high-field alloys such as neodymium-iron-boron or the like. These magnets of array 140 may be arranged and each fabricated/configures as is taught in U.S. Pat. No. 5,722,326 and/or in U.S. Pat. No. 6,633,217, which are both incorporated herein in their entirety by reference. However, other embodiments and configurations for arrays of permanent magnets will be apparent to those skilled in the art and may be used in the vehicles of the present invention to achieve passive magnetic levitation.

The track is an important feature of the invention as it provides the coil assembly that may be provided as an embedded set of coils such as coil 250 which may be insulated wire formed of an electrically conductive material such as copper or other metal or metal alloy. In some cases, each coil 250 is a closed circuit that may be wrapped with a number of profiles such as a rectangular profile with one of its longer sides facing upward (e.g., into the track surface 16 of FIG. 1). The specific material used for the coil wire, the gauge of the wire, the shape and material of the core (not specifically shown in FIG. 2), the spacing of the turns or the number of turns per a particular distance, and other parameters of the levitation coil may be varied to practice the invention and likely will be selected to achieve a desired result based upon other component characteristics such as the configuration of the magnet assembly 140 in the vehicle body 130 and position of the coils 250 in or on the track structure 118. In operation, the coils 250 act to produce a levitating force by inducing electric currents in the assembly 120 in response to moving, $V_{car}$, the permanent magnets in the array 140 near the track structure 118 and coil surfaces. This induced current generates an electromagnetic field that repels the magnet array 140 that is generating a strong magnetic field with a downward direction and the body 130 to which it is attached. In operation, the magnetic fields counteract or balance to act as a compressed spring such that the levitating force (e.g., repelling magnetic forces/fields) increases exponentially as the separation, $H_{lev}$, between the track coil 250 and the array 140 decreases, which makes the assembly 205 well suited to handling varying loads passenger weights and vehicle weights) and acceleration forces caused by banking or corners in a track.

Figure 3:
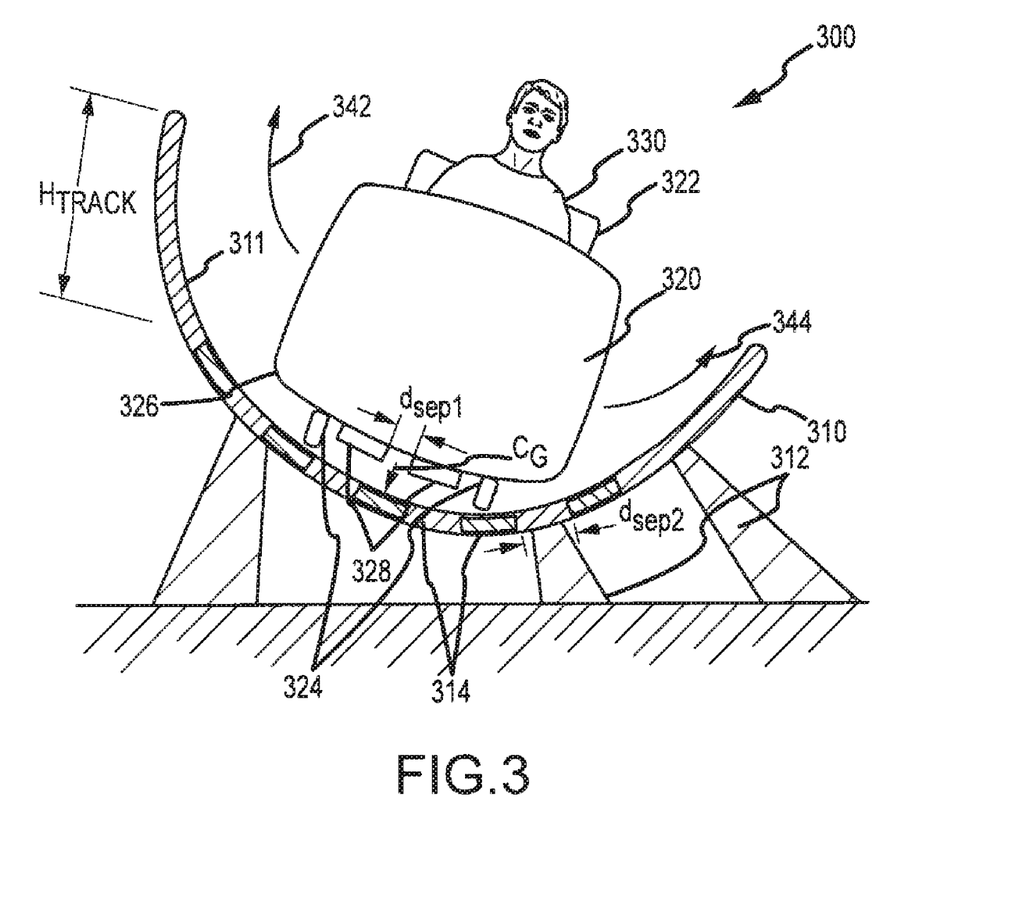
FIG. 3 illustrates an end view of another embodiment of a vehicle and track assembly useful for providing a bobsled or luge-like amusement park ride illustrating the use of passive magnetic levitation with a track configured to safely retain or constrain transverse or side-to-side travel.

FIG. 3 illustrates an end view of another track and vehicle assembly 300 of the present invention that is useful for providing passive magnetic levitation in an amusement park ride. The assembly 300 includes a body 320 adapted with seating 322 for one, two, or more riders 330 in an elongate sled-like car or vehicle, which may be modeled after a bobsled or take on another useful form. The body 320 may be relatively wide to limit tipping and/or flipping issues with a lower center of gravity. The body 320 includes a lower or contact surface 326 that includes casters or wheels 324, such as may be used at the start, finish, and slower paced portions of a ride using assembly 300 and may touch down occasionally on track 310 (e.g., on a particularly steep portion of track or tight bank).

Significantly, a pair of magnet arrays 328 is also mounted upon the lower surface 326. In contrast to assembly 100, the arrays 328 are provided external to the body 320 so as to position them closer to the track 310, which is in part desirable due to the use of wheels 324 that maintain a minimum spacing of the surface 326 from the track 310. The arrays 328 are shown to be generally rectangular in shape and are spaced apart a distance, $d_{sep1}$, that may be selected based on the strength and direction of the flux distribution to limit undesired interaction in the magnetic fields created by the magnets of the arrays 328. In one embodiment, the arrays 328 both include a plurality of permanent magnets, and, in some cases, the permanent magnets are arranged as Halbach arrays (as discussed with reference to FIG. 2 or the like) with the one-side flux or strong magnetic field directed away from the body surface 326 toward the track 310.

Many differing magnets may be used in arrays 328 with one example being a rectangular bar magnet formed from a high-field alloy such as neodymium-iron-boron or the like (e.g., a plate up to 1 inch or more thick that is 3 to 8 inches or more in width and 4 to 12 inches or more in length). Such plate or bar magnets are typically arranged to abut adjacent ones of the magnets in the same array 328 (as shown in FIG. 2). The spacing between the face of the magnets in the arrays 328 and the surface 311 of the track 310 is also typically kept relatively small such that the magnetic forces from the arrays and elongate levitation coils in the track 310 may more readily interact to repel each other and levitate the vehicle body 320, e.g., the wheels may be 4 to 6 inches or more in diameter and the arrays 328 may be positioned with the faces of the magnets about the diameter below the vehicle surface 326 (such as with a small clearance of about 0.25 to 0.5 or more inches).

The assembly 300 includes a track 310 supported physically upon supports 312. The track 310 generally may be arranged to simulate a bobsled or luge run with a significant vertical drop from a starting point to a finishing or end point and also with a number of turns that provide a point for banking and rises or upward sloped track portions to selectively slow or control speed. The track 310 is shown to have an arcuate cross section U or C-shaped sectional configuration) that defines a pipe, trough, chute, or the like similar to that found in luge and bobsled tracks or courses. The track 310 may be formed of a durable material, and, typically, the material is selected to not interfere or undesirably alter magnetic distributions by the magnets 328 and/or in coils 314 of track 310, and, for example, may be made of wood or less expensive materials such as plastic or non-magnetic metals. The track 310 includes an inner or contact surface 311 with sidewalls that limit risks of tipping, flipping, and escape from the track.

Significantly, the track 310 is shown in a banking or curve in which the vehicle 320 is allowed to move transversely as shown by arrows 342 and 344. In other words, the vehicle 320 is not limited to a single path within the track 310 but is instead able to move side-to-side along the course defined for an amusement park ride. This is different than most maglev applications in which the train is aligned on a track and a driving magnetic device is paired tightly with a driven magnetic device and the train track is carefully designed to avoid banking situations and even with additional stability magnetic assemblies to prevent side-to-side travel.

Levitation and side-to-side travel 342, 344 are facilitated by the inclusion of a plurality (or at least 2 or more) levitation coils or circuits 314 in the track 310. The levitation circuits 314 are typically closed circuits made up of insulated, electrically conductive wire that is provided in a coil and that extends along the length of the track 310 (or at least along runs of the track in which levitation is desired). In some cases, the coils are formed by wrapping the wire about a substantially rectangular coil to form a levitation coil with a substantially rectangular profile, with, in most cases, the longer of the two faces or sides facing upward or toward the inner portion of the track (e.g., toward the vehicle 320 traveling in the track 310). The circuits 314 may be a wide variety of widths to practice the invention such as 1 to 8 inches to 1 foot or more, with more being used when the coils are smaller in width. As with the magnet arrays 328, the levitation circuits 314 are typically spaced apart a distance, $d_{sep2}$, such as 0.5 to 3 inches or more, to provide a desired field or flux distribution (e.g., less undesirable interference/interaction between adjacent induced fields).

In this embodiment 300, the levitation circuits 314 are only placed within a relatively central portion of the track 310, and the extent and/or placement of the circuits 314 across the width of the surface 311 may be chosen based upon expected side-to-side travel 342, 344 of vehicle 320. For example, the coils/circuits 314 may only be provided in portions of the track 310 in which it is expected that in normal (or even an extreme or high safety factor) operating conditions of the vehicle 320 or, more accurately, the magnet assemblies 328 are expected to cross or travel. In this embodiment 300, the circuits 314 are wider than the magnet arrays 328 (but this is not a requirement). Also, during operation of the assembly 300, the vehicle 320 is brought to a levitation speed (e.g., several miles per hour or the like), and the permanent magnets of arrays 328 induce current to flow in coils of circuits 314, which generates a magnetic field and creates the levitation force lifting the vehicle 320 off of the surface 311 of the track 310. The embodiment 300 is shown such that the arrays 328 are not necessarily aligned with a particular pair of adjacent ones of the circuits 314. In this manner, the vehicle 320 is able to move side-to-side 342, 344 and to induce current to flow in one or more new ones of the circuits 314 as it starts to travel over these coils at or above the levitation speed. For example, when the track 310 enters a level portion or straightaway, the center of gravity of the body 320 will move to the right 344 as the assembly 300 is illustrated, and this will cause the arrays 328 to be adjacent or proximate differing ones of the circuits 314, which will induce current to flow and a magnetic field to be generated (in the previously unused/dormant circuits 314 or the circuits 314 prior to excitation).

Figure 4:
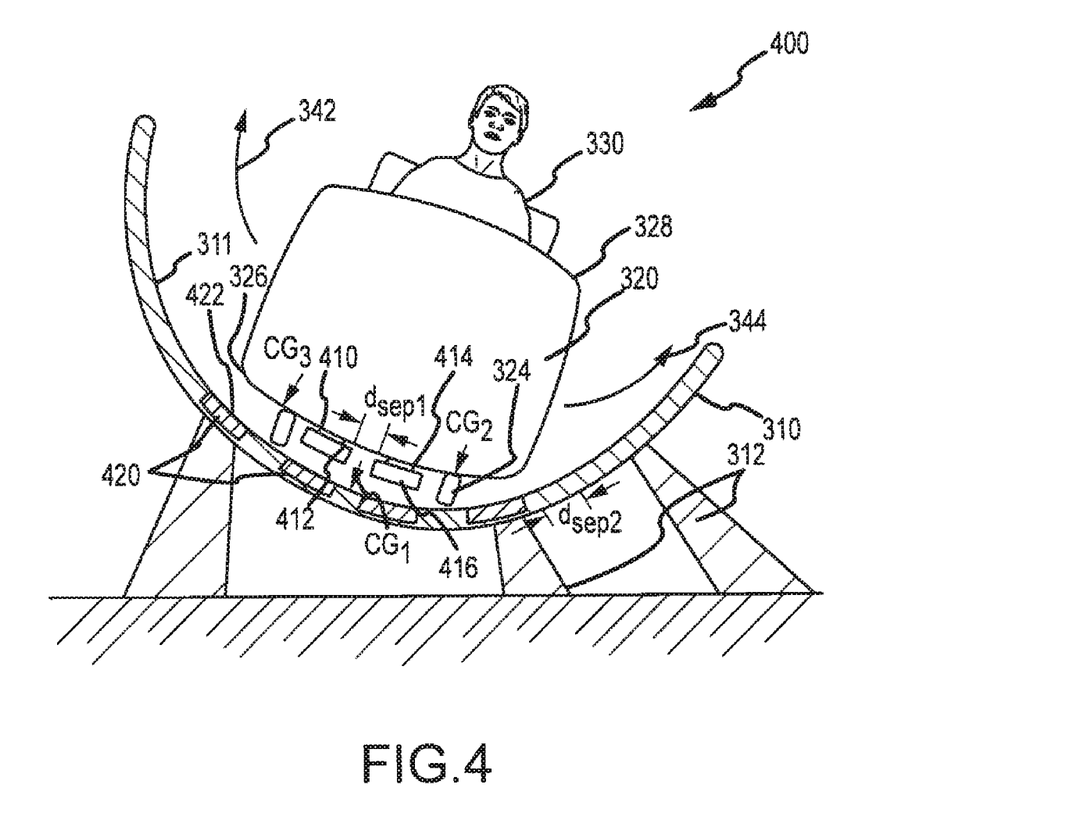
FIG. 4 illustrates an end view similar to FIG. 3 of yet another embodiment of a vehicle and track assembly of the present invention illustrating another configuration for levitation coils built into a track, e.g., with an exposed surface, and also showing a selective pairing between the coils in the track and the magnet array on the vehicle bottom.

FIG. 4 illustrates in a manner similar to FIG. 3 another embodiment of a track and vehicle assembly 400 of the present invention (with similar components having like numbering). As shown, the vehicle 320 is again able to move transverse to the direction of travel of the vehicle 320 as shown by arrows 342, 344 such as in a curve or bank. The assembly 400 differs from the assembly 300 in the configuration of the passive magnetic levitation assembly components. The vehicle 320 again includes a pair of magnet arrays 412, 416 mounted via extensions 410, 414 to the lower surface 326 while the track 310 includes a plurality of levitation circuits 420. In contrast to assembly 300, the assembly 400 calls for the circuits 420 to have a portion or surface of their coils 422 at or coinciding with the surface 311 of track 310 (or, in some cases, slightly recessed or slightly extending) so as to better present the coils to the magnets in arrays 412, 416 (e.g., to better induce current flow in the coils so as to more readily create a magnetic field and levitation force).

Another difference with assembly 400 is that the arrays 412, 414 are separated by a larger separation distance, $d_{sep1}$, as are the coils of circuits 420 as shown by the larger separation distances, $d_{sep2}$. For example, these separation distances may both be about 4 to 6 inches or more in the assembly 400. In the assembly 400, the sizes of the magnets in the arrays 412, 414 (or at least their widths/face widths) are selected to be the same or within a relatively small variance of the width of the coils in the circuits 420. Another feature of the assembly 400 is that the arrays 412, 414 are typically paired or aligned with a pair of the coils 420 in the track 310 as the vehicle 320 travels down or within the track 310. For example, the arrays 412, 414 may be aligned with the pair of circuits 420 as shown in FIG. 4 when the center gravity is aligned as shown by $CG_1$. However, the arrays 412, 414 may align with a different pair of circuits 420 when the center of gravity of the vehicle body 320 shifts to one side 344 as shown by $CG_2$ or to another side 342 as shown by $CG_3$. There will typically be a transition when the vehicle shifts 342, 344 to one side or the other in a banked trim or corner and the vehicle 320 may "overshoot" such alignment but then settle into an alignment as shown in FIG. 4.

Figure 5:
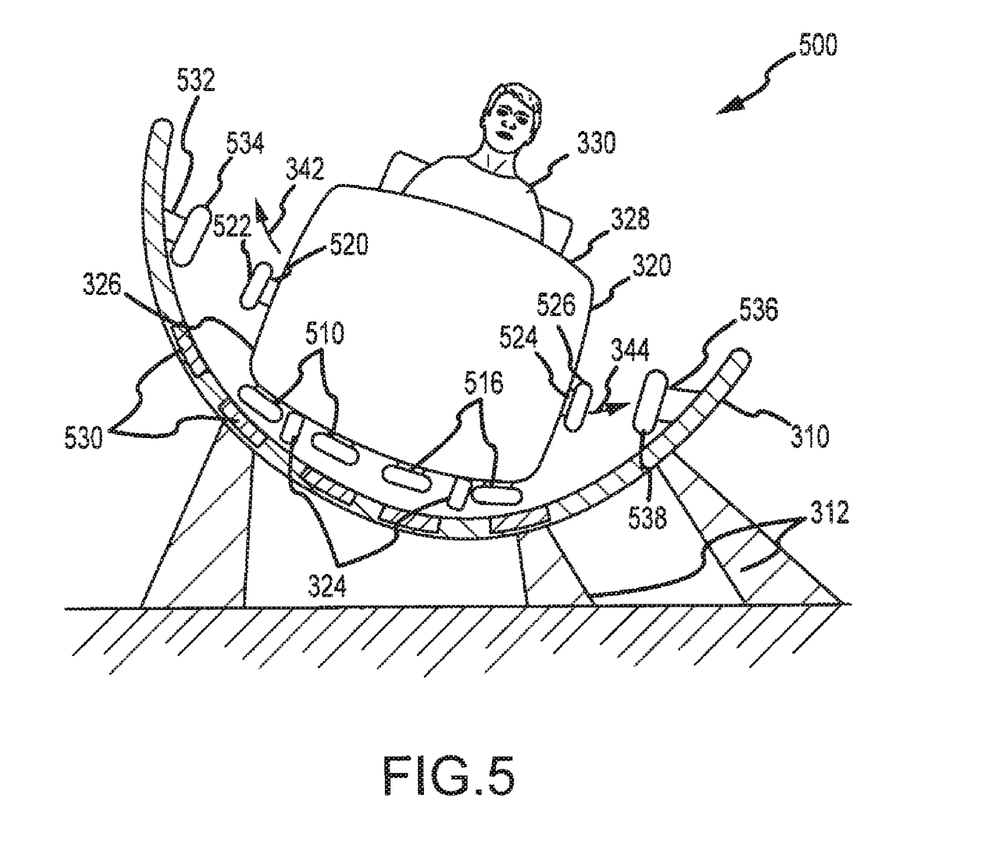
FIG. 5 shows another vehicle and track system of the invention with another arrangement for magnet arrays along with another profile shape for the inductive coil (e.g., more oval than the rectangular profile shown in the other illustrated embodiments) and also showing the use of magnet array/coil pairs as upstop elements for controlling side-to-side or transverse movement/travel of the vehicle within the track.

FIG. 5 illustrates another embodiment of a track and vehicle assembly 500 of the present invention. As shown, the vehicle 320 includes a greater number (e.g., 4 or more) of magnet arrays 516 mounted via extensions 510 on the bottom or lower surface 326 of the vehicle 320. Two of the arrays 516 are provided between the casters or wheels 324 while the other two arrays 516 are positioned outboard of the wheels 324. Four arrays 516 are shown to illustrate that two or more arrays may be utilized to practice the invention (such as 1 to 8 or more arrays with the particular number depending upon a wide variety of factors such as width of vehicle body 320, width of each array, and the like). The arrays 516 are shown to include magnets with a more oval cross section, but this is not a requirement as rectangular magnets may again be utilized in assembly 500. Again, the arrays 516 typically will include a plurality of permanent magnets that are arranged along the length or a large portion of the length of the surface 326 and arranged to provide a strong magnetic field with a direction transverse generally to the surface 326 and directed outward (e.g., toward an adjacent surface 311 of track 310).

Similarly, the track 310 is shown to include a plurality of levitation circuits 530 that, as with the arrays 516, are generally oval or elliptical in profile or cross sectional shape. In other embodiments, these circuits 530 may include more rectangular coils to provide a desired flux distribution or direction when excited by the magnetic field of the arrays 516 traveling at or above a levitation velocity adjacent/over the surface 311 of track 310. In this embodiment 500, the arrays 516 are shown to be somewhat smaller in width than the coil faces of circuits 530, but this is not intended as a limiting feature but only an exemplary embodiment.

Another differing feature of the assembly 500 is that the vehicle 320 includes an additional pair of magnet arrays 522, 526 that are mounted on the side of the vehicle 320 via supports 520, 524. These arrays 522, 526 again may be permanent magnets arranged as Halbach arrays or otherwise to provide a strong magnetic field on one side, e.g., the side facing away from the vehicle 320. The track 310 may also include an additional pair of circuits 534, 538 attached to the track 310 via mounts or supports 532, 536. These circuits 534, 538 may be configured with an oval, rectangular or other profile/shape coil of electrically conductive (but typically not powered) wire. These pairs of magnet arrays and levitation circuits are preferably arranged to provide upstops or to limit the side-to-side travel 342, 344 of the vehicle 320 within the chute or trough 311 of track 310. These lateral stability or upstop pairs of arrays/circuits typically are not within a close enough proximity to excite the coils of the circuit and create a repelling or levitation-type force. However, these components may be provided for particular banking corners or to provide added safety for heavier loading in a vehicle or differing/unexpected operating conditions. If or when a vehicle 320 moves beyond a desired transverse travel range, the magnets in one of the arrays 522, 526 will excite coils in a corresponding (and now proximate or adjacent) circuit 534, 536, and a upstop or repelling force will be created causing the vehicle 320 to return to a more desired portion of the track 310.

Figure 6:
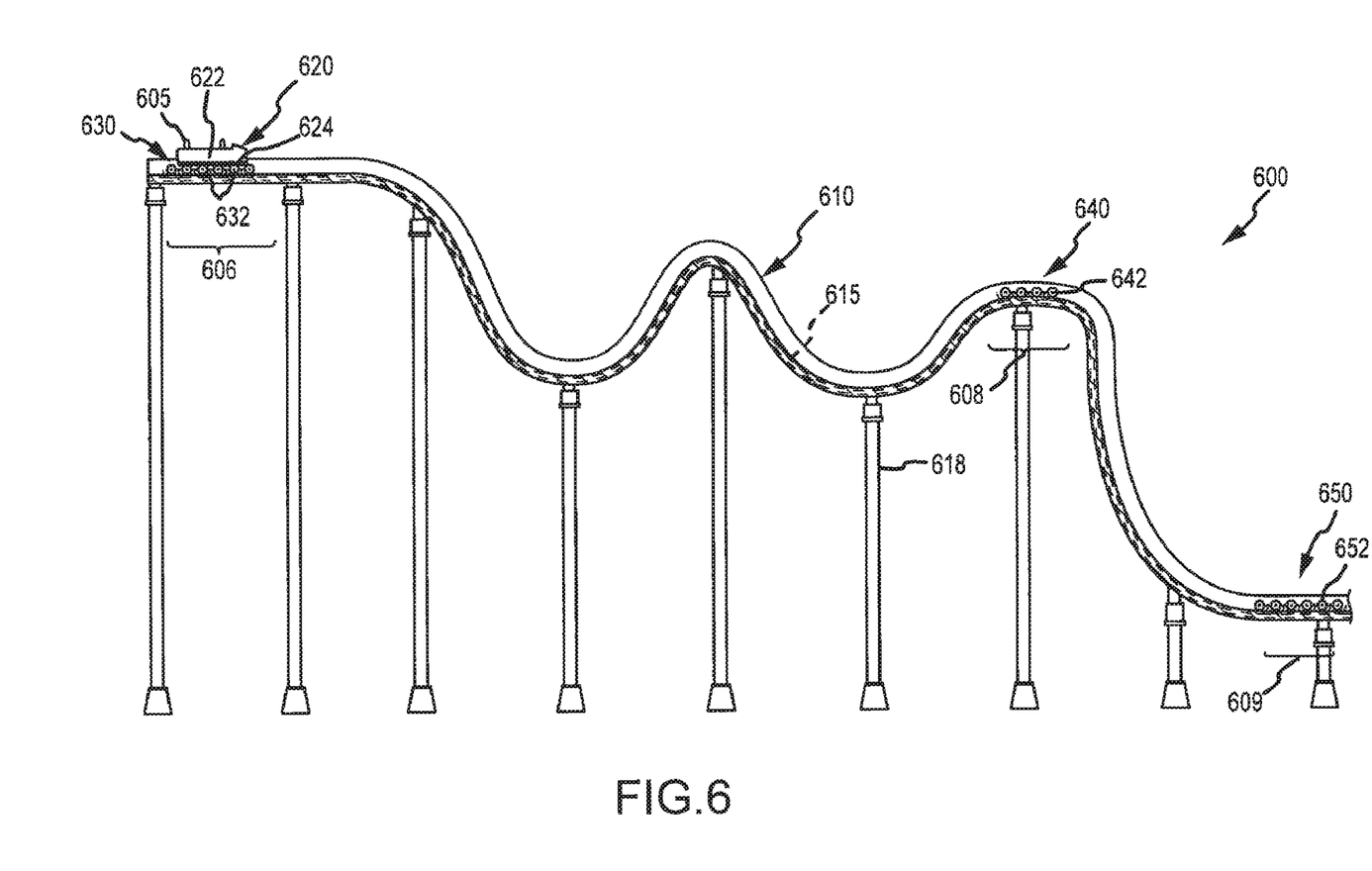
FIG. 6 is a perspective view of a simple exemplary vehicle and track assembly providing an amusement park ride illustrating use of pacer assemblies for accelerating a magnetic levitation vehicle to at least a minimum velocity for passive levitation (and/or to a top of a slope), for maintaining a minimum levitation velocity in a mid-course location, and for braking the vehicle.

FIG. 6 illustrates a track and vehicle system 600 of the present invention showing use of the passive magnetic levitation concepts to provide a bobsled or luge-type amusement park ride. As shown, a track or track assembly 610 is provided that is vertically (and horizontally) supported upon structure or supports 618. The track 610 is arranged such that gravity or fall may be utilized to provide the main motive force for the system 600 (e.g., to allow the system 600 to be generally "passive"). In this regard, the track 610 includes a portion that has a relatively high elevation, which corresponds to a start or launch portion 606 of the ride assembly 600. From this launch portion 606, the track 610 may include a dramatic fall or downward sloped section such that gravity causes a vehicle or car to quickly gain velocity so as to maintain its levitated state above the track surface. Dips or valleys and ridges or peaks may be included in the track 610 as well as one or more curves with banked corners (e.g., to allow travel transverse to the general direction of travel of the vehicle on the track 610). Note, the system 600 may be more extreme in elevation changes and the like than would be used in practice, e.g., the slope may be more gradual than shown in FIG. 6. Also, the track slope may be downward throughout the track at varying amounts (e.g., sometimes going flat or to horizontal but rarely if at all having an upward slope as shown to minimize a risk of a vehicle being stuck in a valley or the like).

As discussed in detail above, the track 610 includes a levitation circuit assembly 615 with one or more coils of electrically conductive wire that runs the length of the track 610 (or at least in portions in which levitation is provided). The track 610 may further include a slowing portion 608 in which levitation is not continued and/or pacers or other devices are used to maintain a levitation velocity for a vehicle (e.g., gravity is not adequate to maintain the needed minimum velocity to excite the coils in assembly 615). Finally, the track 610 includes a finish or braking section 609 where the vehicle comes to a rest and is braked with levitation ending and the vehicle comes to rest on the track surface, where it may be transported back to the launch section 606 (e.g., by devices and/or track portions not shown in the simplified example system 600 of FIG. 6). The track 610 typically will be configured as shown in FIGS. 1-5 with a C or U-shaped cross section with a depth or sidewall heights to retain vehicles within the track and to reduce risks associated with tipping/flipping.

The vehicle 620 is shown in the launch portion 606 of the track 610 with a passenger/rider 605 loaded into its body 622. Within or along a bottom surface of the body 622, the vehicle 620 is shown to include a permanent magnet assembly 624. This assembly 624 may be configured as discussed with reference to FIGS. 1-5 such as with one, two, or more arrays of permanent magnets selected (e.g., with a desired shape, size, strength, and the like) and arranged to create a magnetic flux (or additive set of magnetic fields) directed outward from the body 622 and, more typically, transverse or even perpendicular to the bottom surface of body 622 (e.g., directed generally downward when the vehicle 620 is positioned on the track 610). For example, two or more Halbach arrays may be provided in the assembly 624 to create a strong one-sided magnetic field that excites the coil in levitation circuit assembly 615 to create a levitation force (e.g., a force adequately strong to support the body 622 a height above the surface of the track 610) when the vehicle is traveling at or above a levitation velocity.

To accelerate a vehicle 620 at rest to the levitation velocity, the ride system 600 includes a launch device or mechanism 630 which is shown here to be a pacer assembly with pacers 632 or wheels or the like that rotate and contact the sides/bottom of the vehicle 620. The pacers 632 cause the vehicle 620 to reach the levitation velocity or an edge of a fall in which gravity is used to cause the vehicle 620 to reach the levitation velocity (or the fall may be used to maintain the velocity reached by the pacers 632). The launch device 630 may use other technologies such as conveyor technology (motive, chain, belt, or cable), LIM, LSM, or other devices to accelerate the vehicle 620, and, in some embodiments, the vehicle 620 is loaded on a sloped section of the track 610 and no launch mechanism 630 is required with gravity being used to reach levitation and higher velocities. Pacing devices 640 may also be provided in portions 608 of the track 610 in which the vehicle 610 is allowed to slow below or near the levitation velocity, such as in a show portion of the ride system 600 or in a pre-drop portion where it is desired to build up anticipation. The pacing devices 640 may include towing chains or the like, LSM or similar devices, and/or pacers 642 as shown to move the vehicle 620 along the track at desired velocities and to return the vehicle 620 to levitation velocity (or to a start of another drop where gravity will provide the motive force). A brake system/mechanism 650 may also be included in the ride system 600 that may use a variety of technologies or devices to slow and stop the vehicle 620 such as pacers 652 through repulsive magnetic forces, direction friction, or other techniques. Alternatively, the track 610 may be designed to slow the vehicle with raised and/or flat stretches.

Although the invention has been described and illustrated with a certain degree of particularity, it is understood that the present disclosure has been made only by way of example, and that numerous changes in the combination and arrangement of parts can be resorted to by those skilled in the art. In addition to rows of rectangular, oval, or other shaped coils, the levitation circuit assembly may be provided using other configurations of materials and/or components that inductively create a magnetic field such as stacks of sheets of conductive material spaced apart such as with insulating layers/films (e.g., aluminum sheets with a series of parallel slots etched into each sheet to create a desired path for electrons and/or to control eddy currents that could create power losses).

As discussed above, the magnet array provided on the vehicles of embodiments of the invention may be provided by providing one, two, or more Halbach arrays of permanent magnets, e.g., space-apart, Halbach arrays running the length of a contact or lower external surface of the vehicle. These devices may be thought of as one-sided flux devices or as having a substantially stronger magnetic field on one side. This magnetic flux distribution is generally achieved by providing the components of magnetization (e.g., high-field, rectangular permanent magnets or the like) $\pi/2$ out of phase with each other in the magnetization pattern across the array. In some embodiments of such one-sided flux distribution magnet arrays or devices, the magnetic field is about twice as large on the side in which the flux is confined and, typically, little or no stray field is produced on the opposite or other side, which helps with field confinement for passengers and devices in the body of the vehicle above the magnet arrays or permanent magnet assembly.

We claim:

1. A track and vehicle apparatus for use as an amusement park ride with passive magnetic levitation, comprising:
   an elongate track with a contact surface with an arcuate cross sectional shape and with one or more banked corners, wherein the track further comprises a levitation circuit assembly comprising a plurality of coils of electrically conductive wire each positioned proximate to the contact surface and each of the coils positioned with a longitudinal axis extending along the length of the track; and
   a vehicle with a body for receiving a passenger and having a bottom surface adjacent the contact surface when the vehicle is positioned on the track, wherein the vehicle further comprises two or more elongate arrays of permanent magnets provided proximate to the bottom surface of the body, each of the arrays of permanent magnets being arranged to produce a substantially one-sided flux distribution directed outward from the body of the vehicle;
   wherein the vehicle is levitated a distance above the contact surface by interaction between the arrays of the permanent magnets and the plurality of coils when traveling at a velocity greater than at least a levitation velocity so as to induce current to flow in portions of the coils proximate to the vehicle, wherein the vehicle moves transverse to the plurality of coils and to a main direction of travel at least in the banked corners, and wherein the elongate track comprises sidewalls that extend upward from a center contact portion arranged such that the arcuate cross sectional shape is U-shaped, whereby the elongate track has an opening tending the length of the elongate track.

2. The apparatus of claim 1, wherein each of the arrays of permanent magnets is configured as a Halbach array.

3. The apparatus of claim 1, wherein the arrays of permanent magnets excite a first set of the coils in a first portion of the track near one of the banked corners and, after the vehicle moves traverse to main direct of travel, excite a second set of the coils in a second portion of the track that differs at least in part from the first set of the coils in the one of the banked corners.

4. The apparatus of claim 1, wherein the contact surface is defined in part by a pair of sidewalls extending upward from a center surface and wherein at least one of the coils of the levitation circuit assembly is located in each of the sidewalls.

5. The apparatus of claim 1, wherein the levitation circuit assembly comprises at least four of the coils and the vehicle comprises at least three of the elongate arrays of permanent magnets.

6. The apparatus of claim 1, wherein the vehicle is unrestrained from traveling a predefined distance transverse to a direction of travel for the vehicle on the track.

7. The apparatus of claim 6, further comprising means for restraining the vehicle from traveling beyond the predefined transverse travel distance.

8. The apparatus of claim 1, wherein the track is configured such that the vehicle velocity is governed to be greater than the levitation velocity along a length of the track using gravity and fall and rise of the track.

9. The apparatus of claim 1, wherein the vehicle velocity greater than the levitation velocity is maintained in a length of the track free of active propulsion of the vehicle.

10. The apparatus of claim 1, wherein the coils are arranged to extend in a side-by-side arrangement in the track and to be spaced apart a distance from adjacent ones of the coils.

11. A track and vehicle apparatus for use as an amusement park ride with passive magnetic levitation, comprising:
- an elongate track with a curved contact surface and with one or more banked corners, wherein the track further comprises a levitation circuit assembly comprising a plurality of coils of electrically conductive wire each positioned proximate to the contact surface and each extending along the length of the track; and
- a vehicle with a body for receiving a passenger and having a bottom surface adjacent the contact surface when the vehicle is positioned on the track, wherein the vehicle further comprises two or more elongate arrays of permanent magnets provided proximate to the bottom surface of the body, each of the arrays of permanent magnets being arranged to produce a substantially one-sided flux distribution directed outward from the body of the vehicle;
- wherein the vehicle is levitated a distance above the contact surface by interaction between the arrays of the permanent magnets and the plurality of coils when traveling at a velocity greater than at least a levitation velocity, wherein the vehicle moves transverse to the plurality of coils and to a main direction of travel at least in the banked corners, and wherein each of the coils is wrapped with a substantially rectangular profile and is positioned with a larger face substantially coplanar to the contact surface.

12. A track and vehicle assembly for use in a flying corners amusement park ride, comprising:
- a track assembly including a length of track comprising an upper contact surface having an arcuate sectional shape defining a channel, wherein a first portion of the track is provided at a first elevation greater than a second elevation of a second portion of the track and wherein the track assembly comprises two or more spaced-apart coils of wire extending the length of the track proximate to the contact surface;
- a vehicle comprising a body with a lower portion positioned adjacent the contract surface and at least one array of permanent magnets provided on the lower portion of the body; and
- a launch mechanism for providing the vehicle at the first portion of the track at a predefined velocity greater than about a levitation velocity, wherein the at least one array of permanent magnets interact with the coils of wire in the track at the predefined velocity to cause the coil of wires to generate a magnetic field by inducing current flow in the coils to levitate the vehicle above the contact surface, and wherein a velocity of the vehicle is governed to exceed the levitation velocity between the first and second portions by gravity acting on the vehicle and rise and fall in the track,
- wherein the track comprises sidewalls that extend upward from a center contact portion arranged such that the channel is U-shaped, whereby the track has an opening extending the length of the track.

13. The assembly of claim 12, wherein the first elevation and the second elevation are selected such that the vehicle travels at velocities greater than about the levitation velocity along the length of track.

14. The assembly of claim 12, wherein the vehicle comprises two or more of the arrays of permanent magnets and the track comprises a number of the coils that exceeds the number of arrays of permanent magnets.

15. The assembly of claim 14, wherein the coils are provided across a width of the contact surface and the two or more of the arrays of the permanent magnets extend across a width of the lower portion of the body that is less than the width of the contact surface associated with the coils.

16. The assembly of claim 15, wherein the length of track comprises at least one banked corner, the vehicle traveling transverse to the coils of wire at least in the banked corner such that the permanent magnets of the vehicle align with and induce current flow in a differing set of the space-apart coils in the track.

17. The assembly of claim 12, wherein at least the one array of permanent magnets are configured with a pole pattern corresponding to a Halbach array to provide a stronger magnetic field on a side of the magnets facing the contact surface of the track.

18. An amusement park ride with a flying corner effect, comprising:
- a track with a channel defined by an arcuate contact surface, the track arranged with banked corners and an elevated launch portion and a brake portion lower than the launch portion;
- a vehicle with a body including two or more sets of permanent magnets extending along a bottom portion of the body and arranged as Halbach arrays with a strong magnetic field directed outward from the body; and
- a levitation assembly provided proximate to the contact surface along the track,
- wherein, when the vehicle passes over the contact surface at a predefined velocity, the levitation assembly is induced by the magnetic fields of the sets of permanent magnets on the bottom portion of the body to generate a magnetic field,
- wherein the magnetic field of the levitation assembly and the magnetic fields of the sets of permanent magnets levitate the vehicle above the contact surface,
- wherein the vehicle is maintained at or above the predefined velocity in the track between the launch portion and the brake portion using gravity and difference in elevation between the launch and brake portions, and
- wherein the track comprises sidewalls that extend upward from a center contact portion arranged such that the channel is U-shaped, whereby the track has an opening extending the length of the track.

19. The amusement park ride of claim 18, wherein the vehicle travels transverse to a main direction of travel along the track in the banked corners while remaining levitated by the levitation assembly and the permanent magnets.

20. The amusement park ride of claim 18, wherein the levitation assembly comprises a number of coils of wire each arranged in a closed circuit and extending lengthwise along the contact surface of the track.

21. The amusement park ride of claim 20, wherein the number of coils of wire exceeds a number of the sets of permanent magnets on the vehicle body.

22. The amusement park ride of claim 18, wherein the elevated launch portion is located at a height above the brake portion that is selected such that the vehicle travels in the channel of the track in response to gravitational forces at speeds exceeding the predefined velocity.

23. An amusement park ride with a flying corner effect, comprising:
- a track with a channel defined by a contact surface, the track arranged with banked corners and an elevated launch portion and a brake portion lower than the launch portion;
- a vehicle with a body including two or more sets of permanent magnets extending along a bottom portion of the body and arranged as Halbach arrays with a strong magnetic field directed outward from the body; and a levitation assembly provided proximate to the contact surface along the track, wherein, when the vehicle passes over the contact surface at a predefined velocity, the levitation assembly is induced by the magnetic fields of the sets of permanent magnets on the bottom portion of the body to generate a magnetic field and wherein the magnetic field of the levitation assembly and the magnetic fields of the sets of permanent magnets levitate the vehicle above the contact surface, wherein each of the coils has a profile as viewed at an end that is substantially rectangular, wherein each of the coils is positioned with a wider side of the rectangular profile proximate to the contact surface, and wherein a width of the magnets in the Halbach arrays differs from a width of the wider side of the profile of the coils.

\* \* \* \* \*

UNITED STATES PATENT AND TRADEMARK OFFICE
CERTIFICATE OF CORRECTION

| | | |
|---|---|---|
| PATENT NO. | : 7,950,333 B2 | Page 1 of 1 |
| APPLICATION NO. | : 12/046182 | |
| DATED | : May 31, 2011 | |
| INVENTOR(S) | : Crawford et al. | |

It is certified that error appears in the above-identified patent and that said Letters Patent is hereby corrected as shown below:

Column 14, line 33, delete "tending" and insert therefor --extending--.

Signed and Sealed this
Nineteenth Day of July, 2011

David J. Kappos
*Director of the United States Patent and Trademark Office*